United States Patent [19]
Reinke

[11] Patent Number: 5,258,807
[45] Date of Patent: Nov. 2, 1993

[54] MULTIFORMAT FILM CLAMP
[75] Inventor: Stephen M. Reinke, Rochester, N.Y.
[73] Assignee: Eastman Kodak Company, Rochester, N.Y.
[21] Appl. No.: 906,635
[22] Filed: Jun. 30, 1992
[51] Int. Cl.⁵ .................... G03B 27/62; G03B 27/64
[52] U.S. Cl. ...................................... 355/76; 352/223
[58] Field of Search ................. 355/75, 76, 72; 352/223; 354/276

[56] References Cited

U.S. PATENT DOCUMENTS

| | | | |
|---|---|---|---|
| 2,110,475 | 3/1938 | Schubert | 355/76 |
| 2,174,020 | 9/1939 | Sumner | 352/221 |
| 2,248,646 | 7/1941 | Small | 355/76 |
| 2,263,025 | 11/1941 | Young, Jr. et al. | 355/76 |
| 2,824,491 | 2/1958 | Hoffmaster | 355/76 |
| 3,132,560 | 5/1964 | Pignone et al. | 354/276 |
| 3,397,613 | 4/1968 | Kallenberg | 355/76 |
| 3,488,120 | 1/1970 | Nagel | 355/75 |
| 3,511,565 | 5/1970 | Harman et al. | 355/56 |
| 3,944,366 | 3/1976 | Robertson | 355/76 |
| 4,161,365 | 7/1979 | Anderson et al. | 355/75 |
| 4,252,436 | 2/1981 | Kogane | 355/75 |
| 4,313,677 | 2/1982 | Stewart | 355/76 |
| 4,353,645 | 10/1982 | Kogane et al. | 355/75 |
| 4,353,646 | 10/1982 | Bartel et al. | 355/76 |
| 4,396,281 | 8/1983 | Okabe et al. | 355/76 |
| 4,396,282 | 8/1983 | Anderson | 355/76 |
| 4,396,283 | 8/1983 | Anderson et al. | 355/76 |
| 4,444,494 | 4/1984 | Koyama et al. | 355/75 |
| 4,483,612 | 11/1984 | Binder | 355/76 |
| 4,497,574 | 2/1985 | Tarsia et al. | 355/76 |
| 4,545,674 | 10/1985 | Ishitate et al. | 355/75 |
| 4,592,652 | 6/1986 | Henmi et al. | 355/76 |
| 4,736,228 | 4/1988 | Ito | 355/75 |
| 4,761,675 | 8/1988 | Sawasaki | 355/76 |
| 4,965,631 | 10/1990 | Ozawa | 355/75 |
| 4,965,632 | 10/1990 | Jadrich et al. | 355/76 |
| 5,028,956 | 7/1991 | Vanscooter et al. | 355/72 |
| 5,055,874 | 10/1991 | Kralles | 355/76 |
| 5,073,022 | 12/1991 | Pistor et al. | 352/223 |
| 5,128,714 | 7/1992 | Kishino | 355/76 |

FOREIGN PATENT DOCUMENTS 685196  4/1964  Canada .
336842 10/1930  United Kingdom .

Primary Examiner—Richard A. Wintercorn
Attorney, Agent, or Firm—Edward Dugas

[57] ABSTRACT

Clamping of different format sizes of film is achieved by aperatured inserts of the required size being insertable in a base member and a platen. The base member is provided with a relatively flat surface and an aperature therein over which a film strip is positioned. The platen is provided with an aperture therethrough and a gripping strips positioned around the periphery of the aperature with the gripping strips being angled away from the aperture. A clamping of the platen to the base member, with said apertures in alignment, provides a tension in the film along all sides of the aperture as the gripping strips are urged outward from the aperture. A two degree of freedom gimbal is formed in the platen to insures that the gripping strips clamp parallel to the aperture plate. Also the design will apply an equal and even clamping force and tension around the film because the two degrees of fredom of rotations are about the center of the clamping plate inserts. The gimbal clamp also reduces the need for accurate set up of clamping plate relative to the aperture plate insert.

20 Claims, 4 Drawing Sheets

MULTIFORMAT FILM CLAMP

TECHNICAL FIELD OF THE INVENTION

The present invention relates to a film clamp for use in apparatus such as a film scanner, and more particularly, to a film clamp for holding a film extremely flat in a film gate in such apparatus.

BACKGROUND OF THE INVENTION

A considerable variety of techniques and apparatus have been developed over the years for holding films flat for the purpose of enlarging and scanning images.

For example, U.S. Pat. No. 2,248,646 discloses such an apparatus for photographic film tensioning. This patent illustrates in its FIGS. V, VI and VII how the clamp is engaged and how the arched bow springs provide tension to the film strip in one direction.

U.S. Pat. No. 4,965,632 also illustrates a film clamp which tensions film only in one direction using arms which move during clamping. The uniformity of the clamping and tensioning force along the clamped surface is dependent on the spring stiffness of each arm to be very close, and the height of the clamping cylinders to be set up accurately.

FIGS. 1 through 4 illustrate in free body diagram form how a film clamp according to U.S. Pat. No. 4,965,632 functions. The film 1 is positioned on a platen 3 over a rectangular aperture 5. In each of the figures force vectors are indicated by arrowed lines.

In the clamp of this patent, (a) the gripping member that makes contact with the proximal side of the film 1 presses at least essentially vertically against the film 1, and (b) the gripping member that makes contact with the distal side of the film 1 presses both toward the platen 3 and away form the proximal gripping member as illustrated by an arrow 9 of force $F_2$ in FIG. 4.

Note that, if $\mu$ is the coefficient of static friction between the film 1 and the platen surface, the following relationship must be maintained:

$$F_2 \cos\theta < \mu F_1 + \mu F_2 \sin\theta$$

Failure to meet this condition will result in slippage of the entire film 1 in the y direction when the force $F_2$ is applied.

In another patent, U.S. No. 4,161,365 a neghold assembly clamps a film strip between two insert plates. FIGS. 3, 4, and 7 of that patent illustrate the concept. The top insert plate 28 is allowed to pivot in one direction by guides 68 and 70. This provides some ability for the top plate 28 to be clamped parallel to a bottom plate 30. No method for tensioning the film is provided in the patent.

In the prior art film clamp, illustrated in FIGS. 1 and 2, the film 1 is clamped against the platen 3 on all four edges of the rectangular aperture 5 by a vertical force (represented by a plurality of arrows 7). The natural curl in film 1 will not be removed during clamping, and film will not be held flat.

U.S. Pat. No. 4,736,228 also provides a means to clamp film and to maintain parallel clamping plates. However, the design depends on the two springs 12, as shown in FIG. 3 to have very similar stiffness and preload. This patent also provides no tensioning of the film.

In U.S. Pat. No. 5,073,022 tension is applied to a film around the circumference of the aperture opening when the film is clamped between two o-rings that are biased to tension outward from the center of the film by the forming of an incline in the plates that receive the o-rings for clamping. To function properly the rubber o-ring needs to be formed with a uniform thickness, tension and hardness for this technique to provide a flat datum plain for the film. Also the tensioning force will vary based on the above variations. No technique is shown to provide an even clamping force.

Finally, U.S. Pat. No. 2,824,491 illustrates a film holder which is designed to tension the film flat. It also tensions the film in only one direction and its clamping and tensioning force on each edge is dependent on similar spring manufacturing capabilities.

While film holders and clamps of the types just discussed have achieved some acceptance and success, a need for a simple clamping mechanism which provides tension to the film in two directions is needed to achieve uniform flatness.

Also, there is a need for a simple mechanism which applies a uniform clamping and tensioning force around the perimeter of the film. Finally, a mechanism which can be easily converted to different format sizes is desirable.

SUMMARY OF THE INVENTION

The purpose of this invention is to provide a means of holding different sizes of photographic film or similar materials flat. The film is clamped and put in tension in two directions; along the width and height of the area of interest. The clamping and tensioning forces are made equal around the perimeter of the flattened area by the use of a gimbaling clamp mechanism.

In one embodiment of the invention the film clamp is comprised of, a base member having a relatively flat surface and an aperture therein over which a film strip is positioned, a platen member having an aperture there through is formed to be clamped onto the base member, a gripping means affixed to the platen is positioned around the periphery of the aperture and angled away from the aperture such that a clamping force applied to the sandwich of the, base member, film, and the platen, causes the gripping means to tension the film flat over the apertures. Additionally, a preferred embodiment of the invention incorporates a mount for removable aperture plates which mount is a two degree of freedom mount that allows the aperture plates to align flat with the surface of the base member. Each of the aperture plates is sized for the particular type of film that is to be clamped.

From the foregoing it can be seen that it is a primary object of the present invention to provide a film clamp for applying tension forces in two directions along the plane of the film.

It is a further object of the present invention to provide an improved film clamp that can easily accommodate different sizes of film.

It is yet another object of the present invention to provide a simple low cost clamp for holding multiformat films flat over an aperture gate.

These and other objects of the present invention will become more apparent when taken in conjunction with the following description and drawings wherein like characters indicate like parts and which drawings form a part of the present description.

DESCRIPTION OF THE PREFERRED EMBODIMENTS

Figure 5:
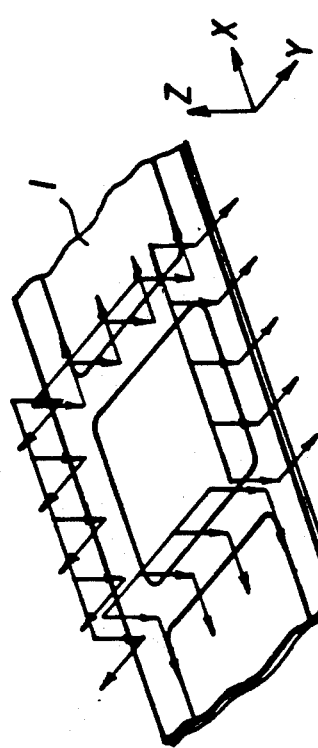
FIG. 5 illustrates, in perspective view, the forces applied to a section of film in accordance with the present invention.

Referring to FIG. 5, as FIGS. 1 through 4 were discussed in the section entitled Background of the Invention, the film 1 is clamped and tensioned along the width and length edges of film area.

Figure 6:
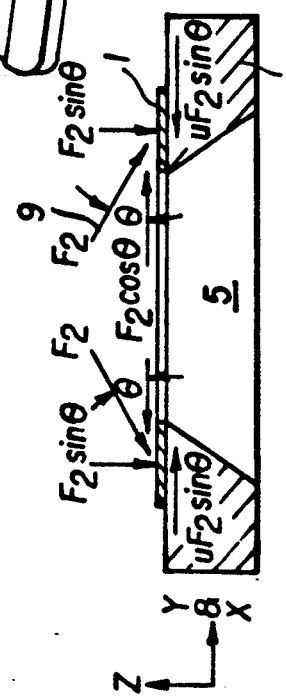
FIG. 6 illustrates in cross sectional view the film section of FIG. 5 positioned over an apertured platen.

FIG. 6 illustrates that all edges of the film 1 are under the same clamping force $F_2 \sin \theta$ and some tensioning force $F_2 \cos \theta$. The force resistive to the motion of the film 1 at all edged is $\mu F_2 \sin \theta$.

Note that, $\mu$ is the coefficient of friction between the film 1 and surface of the platen 3. To function properly the following relation must be maintained:

$$F_2 \cos \theta > \mu F_2 \sin \theta$$

This allows the film 1 to move relative to the platen surface, but not relative to the tensioning clamp.

Figure 1:
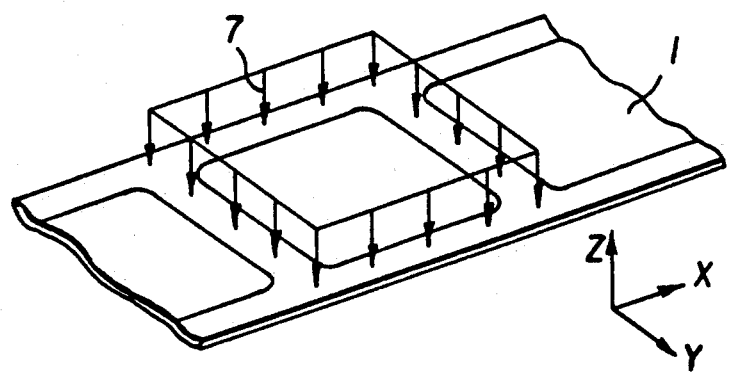
FIG. 1 illustrates, in perspective view the forces applied to a film section by a prior art film clamp.
Figure 2:
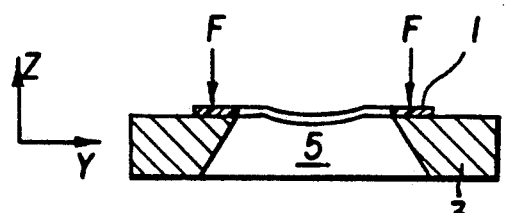
FIG. 2 illustrates, in cross section, the forces applied to a film section positioned over an apertured platen according to the prior art of FIG. 1.
Figure 3:
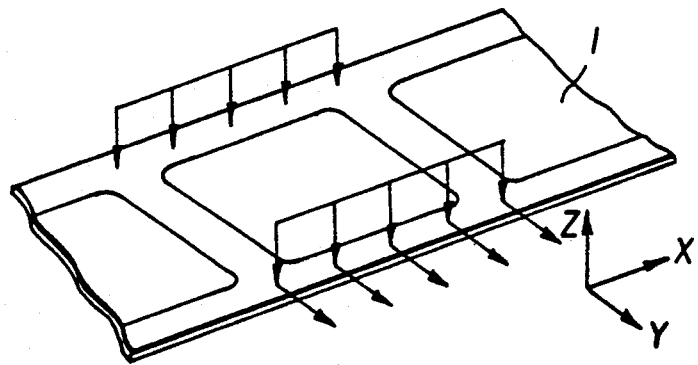
FIG. 3 illustrates a perspective view the tensioning force applied to the film section of FIG. 1 by a prior art film clamp.
Figure 4:
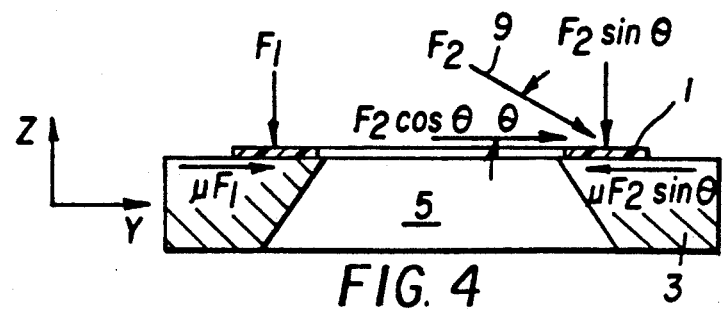
FIG. 4 illustrates, in cross section, the tension forces applied to the film section of FIG. 1 positioned over an apertured platen according to the prior art.
Figure 7:
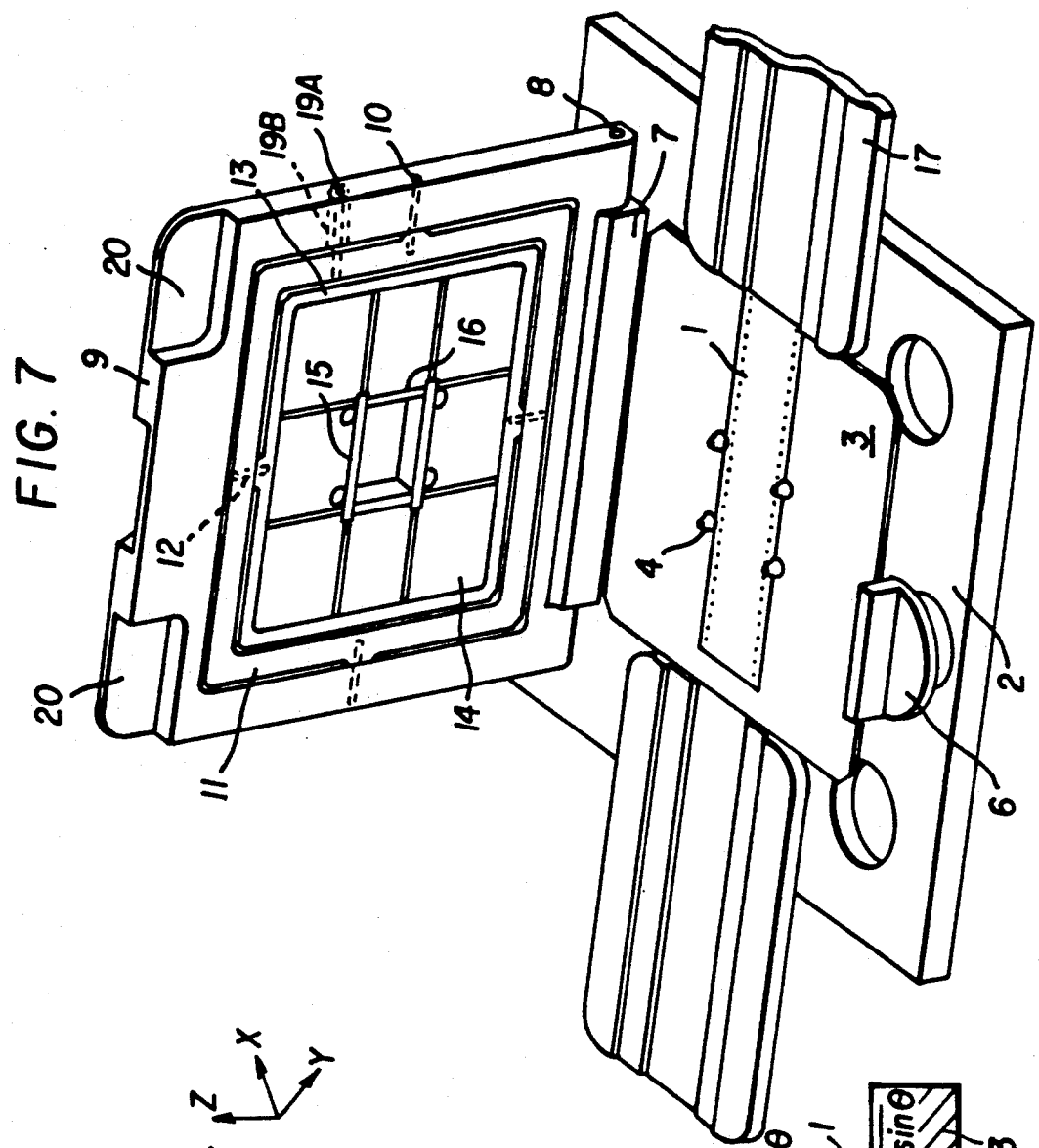
FIG. 7 is a perspective view of an embodiment of a film clamp, in the open position, according to the present invention.

FIG. 7 shows the preferred embodiment of the film clamp in the open (unclamped position). In this embodiment, there is a base plate 2 which has a fixed mount 7 attached to it. The fixed mount 7 supports a main clamp frame 9, which is pivotally mounted by two pins 8. The main clamp frame 9 is manually opened and closed by holding the relieved outboard corners 20 which act as handles. It is to be appreciated that the frame 9 does not have to be pivotally mounted to the base plate 2, but could be freely positioned over the base plate 2 or guided with vertical guides into clamping alignment with the base plate 2.

Pivotally mounted to the inside opening of the main clamp frame 9 is a gimbal frame 11. Two pins 10 allow the gimbal frame 11 to rotate about an axis parallel to the main clamp frame 9's pivot axis, defined by pins 8 to provide a first degree of freedom.

Pivotally mounted to the gimbal frame 11 is an insert frame 13, which is pivotally mounted by two pins 12. The two pins 12 allow the insert frame 13 to rotate perpendicular to the main clamp frame 9's pivot axis to provide a second degree of freedom.

A clamp insert 14 is snapped into the insert frame 13 with a pair of ball plunger detents not shown. This allows the operator to quickly change the clamp insert 14 for different formats.

Likewise, an aperture plate 3 is held in place via magnets (not shown) which are mounted slightly below the top surface of base 2.

Figures 8, 9:
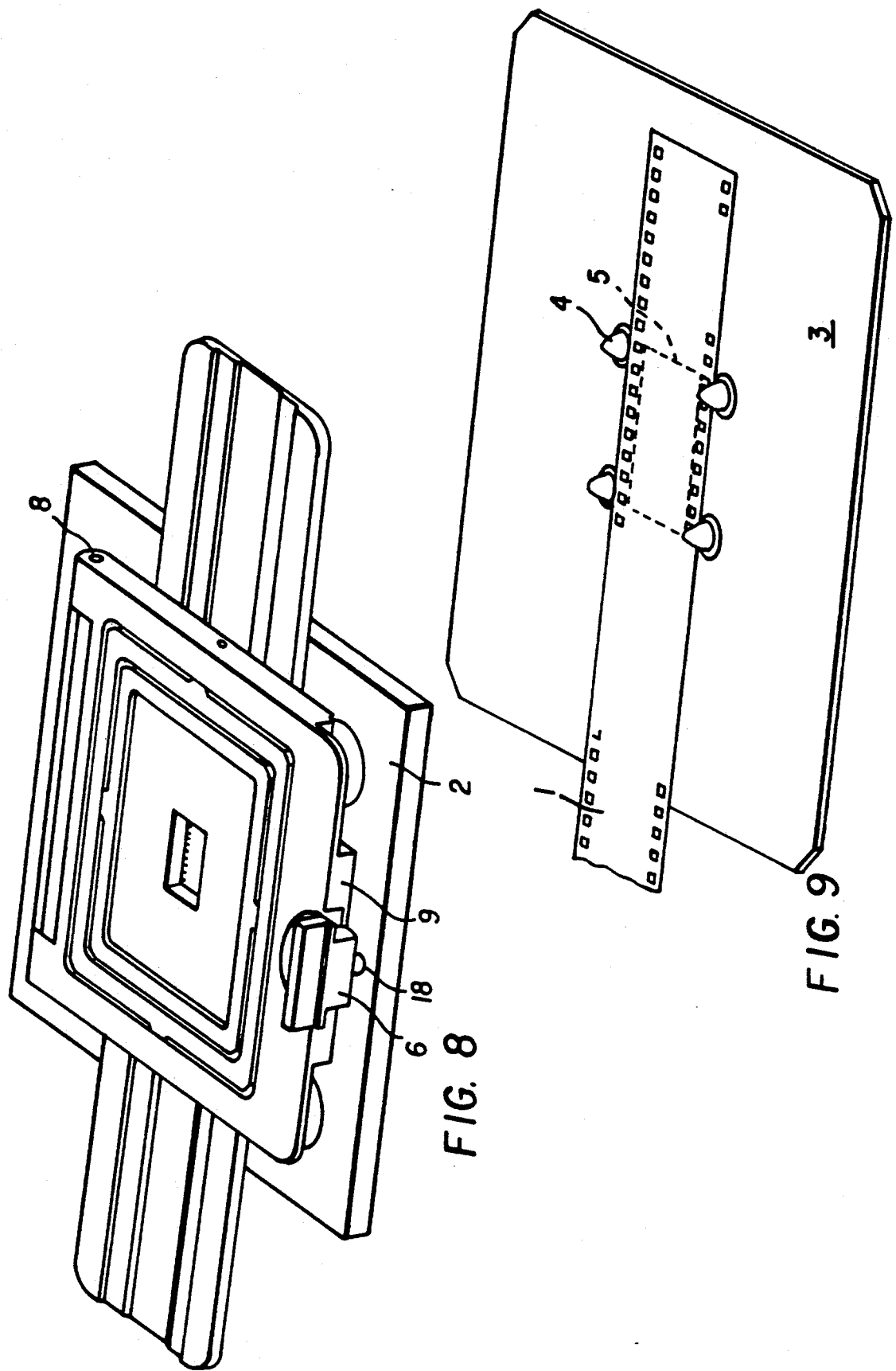
FIG. 8 is a perspective view of an embodiment of a film clamp, in the closed position, according to the present invention.
FIG. 9 illustrates a perspective view of an aperture plate assembly for 35 mm film strips or cuts that is used in the present invention.

The gimbal frame 11 provides for self aligning of the clamp insert 14 (an insert for 35 mm film is shown in FIG. 7) to the surface of the aperture plate 3, when the clamp frame 9 is rotated to the close position (as shown in FIG. 8).

The film 1 is located along its width by four positioning pins 4 which are fixed to the aperture plate 3. There are different size aperture plates and pin position for different film formats. FIG. 9 illustrates an aperture plate 3 having an opening 5 defined therein with positioning pins 4.

Figure 10:
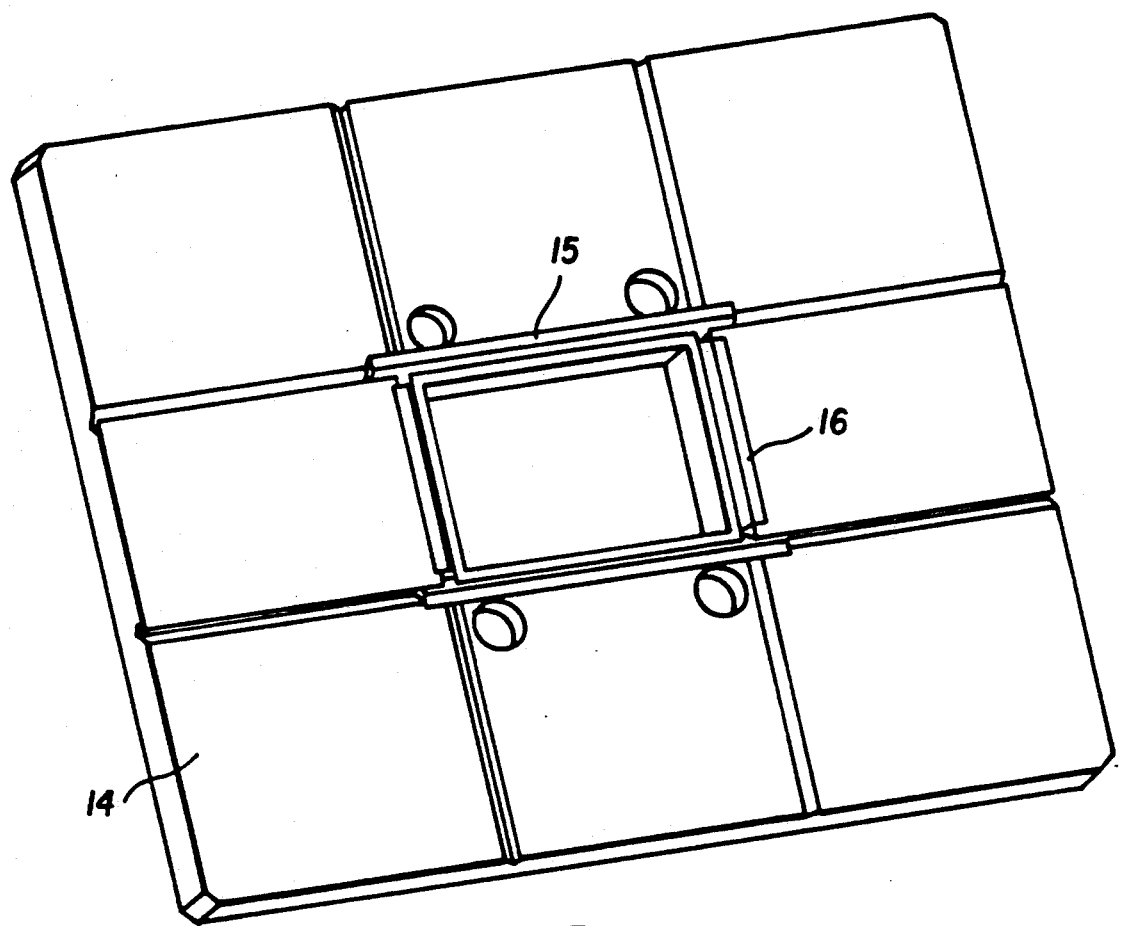
FIG. 10 illustrates a perspective view of a clamping plate insert for 35 mm film strips or cuts that is used in the present invention.

FIG. 10 illustrates the clamp insert 14 having two pairs of outwardly angled rubber strips 15 and 16 fixed about its aperture opening 5. The rubber strips are at equal heights above the clamp inserts top surface. Although the rubber strips 15 and 16 are shown fixed to the clamp insert they may alternately be affixed to the aperture plate or to both the aperture plate and to the clamp insert. Openings 21 are provided in the clamp insert for receiving the positioning pins 4 when the clamp is closed.

During clamping of the film strip 1 the rubber strips 15 and 16 compress and buckle outward from the center of the apertured opening 5 to provide the clamping and tensioning forces as illustrated in FIGS. 5 and 6 to the film 1.

The clamping force is generated by rotating a cam knob 6 180° to the clamp position, similar to a window latch, The cam knob is pivotally mounted to the base 2 by a pivot shoulder screw 18, as seen in FIG. 8.

For convenience, film strip guides 17 are attached to each side of the base 2 to facilitate the holding of film strips by their edges.

Finally, both the gimbal frame 11 and insert frame 13 rotation can be limited by pins 19A and associated clearance holes 19B as illustrated in FIG. 7.

Test results from hardware using this technique demonstrated film flatness within ±0.002 inches for 120 format film. These results appear to be superior to conventional techniques discussed previously.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

I claim:

1. A film clamp comprising:
   a base plate having an aperture defined there through;
   a platen having a flat surface and an aperture defined therein pivotally mounted at one edge to said base plate with the apertures of said base plate and said platen aligned with each other when the platen is clamped to the base plate; and
   flexible gripping strips positioned around the periphery of the aperture in said platen, each of said strips angled outward from the aperture so as to grip and tension a film positioned between said base plate and said platen when they are clamped together.

2. The film clamp according to claim 1 wherein the flexible gripping strips are positioned around the aperture in said base plate.

3. The film clamp according to claim 1 wherein flexible gripping strips are positioned around the apertures in both the platen and the base plate.

4. The film clamp according to claim 1 and further comprising:
   a clamp insert having an aperture there through; and
   means for mounting said clamp insert to said platen with two degrees of freedom to provide for accurate alignment of said clamp insert with said base plate when the platen is clamped to said base plate.

5. The film clamp according to claim 4 wherein a plurality of clamp inserts are provided one for each size of film to be clamped.

6. The film clamp according to claim 4 wherein said means for mounting mounts said clamp insert to said base plate rather than to said platen.

7. The film clamp according to claim 4 wherein said means for mounting is comprised of:
   a gimbal;
   a pair of pivot pins mounting said gimbal to said platen about a first axis of freedom; and
   a second pair of pivot pins mounting said clamp insert to said gimbal about a second axis of freedom.

8. The film clamp according to claim 1 and further comprising:
   an plurality of aperture plates of different sizes, one for each size film to be clamped;
   means for removably affixing said aperture plates one at a time to said base member.

9. The film clamp according to claim 8 and further comprising a plurality of guide pins removably mounted to said aperture plates to guide said film into position over said aperture.

10. The film clamp according to claim 7 and further comprising:
    an insert frame pivotally mounted to said gimbal with said clamp insert removably mounted to said insert frame.

11. A film clamp comprising:
    a base member having a relatively flat surface and an aperture therein over which a film strip is positioned;
    a platen member having an aperture there through;
    gripping means positioned around the periphery of the aperture in said platen means and angled away from the aperture; and
    means for clamping said platen to said base member with said apertures in alignment so as to provide a tension in the film along all sides of the aperture as clamping pressure is applied.

12. The film clamp according to claim 11 wherein said gripping means are positioned around the aperture in said base member.

13. The film clamp according to claim 11 wherein said gripping means are positioned around the apertures in both the platen and the base member.

14. The film clamp according to claim 11 and further comprising:
    a clamp insert having an aperture there through; and
    means for mounting said clamp insert to said platen member with two degrees of freedom to provide for accurate alignment of said clamp insert with said base member when said platen member is clamped to said base member.

15. The film clamp according to claim 14 wherein a plurality of clamp inserts are provided, one for each size of film to be clamped.

16. The film clamp according to claim 14 wherein said means for mounting mounts said clamp insert to said base member rather than to said platen member.

17. The film clamp according to claim 14 wherein said means for mounting is comprised of:
    a gimbal;
    a pair of pivot pins mounting said gimbal to said platen member about a first axis of freedom; and
    a second pair of pivot pins mounting said clamp insert to said gimbal about a second axis of freedom.

18. The film clamp according to claim 11 and further comprising:
    an plurality of aperture plates of different sizes, one for each size film to be clamped;
    means for removably affixing said aperture plates one at a time to said base member.

19. The film clamp according to claim 18 and further comprising a plurality of guide pins removably mounted to said aperture plates to guide said film into position over said aperture.

20. The film clamp according to claim 17 and further comprising:
    an insert frame pivotally mounted to said gimbal with said clamp insert removably mounted to said insert frame.

* * * * *